Dec. 25, 1923.

E. H. JONES 1,478,788

TIRE AND MANUFACTURE OF THE SAME

Filed Dec. 31, 1921    2 Sheets-Sheet 1

Inventor
Ernest H. Jones
by Herbert W. Jenner
Attorney.

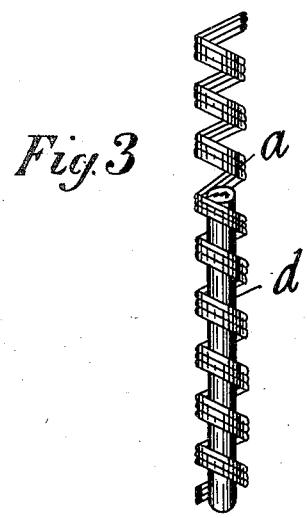
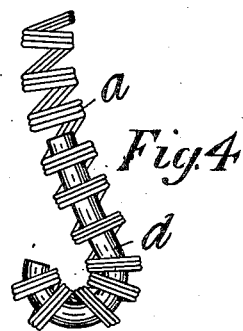
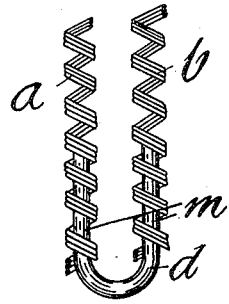
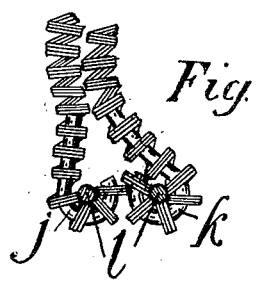

Patented Dec. 25, 1923.

1,478,788

UNITED STATES PATENT OFFICE.

ERNEST HENRY JONES, OF LONDON, ENGLAND.

TIRE AND MANUFACTURE OF THE SAME.

Application filed December 31, 1921. Serial No. 526,202.

*To all whom it may concern:*

Be it known that I, ERNEST HENRY JONES, British subject, of 18-20 Church Street, Islington, London, N. 1, England, have invented certain new and useful Improvements in or Relating to Tires and Manufacture of the Same, of which the following is a specification.

The invention refers to tires, particularly pneumatic tires, and has for its object to improve the casing which protects the inner tube. This casing may be embodied in the actual outer cover of the tire, or may be a separate casing between the inner tube and the outer cover.

The present improvements relate to tire casings comprised of wires helices arranged to pass from one side edge of the tire casing to the other either diagonally or transversely. The improvements consist in the combination with these wire helices which comprise the casing, or certain of them, of ductile, nonresilient members, which members together with the end of the helices can be bent, folded or manipulated as desired to conform with the desired shape of the bead or side edge of the tire, and when so fashioned to the desired shape or configuration will remain and retain therewith the resilient element comprising the ends of the helices.

A convenient embodiment is a short metal wire or rod, say of steel or other suitable metal or metal alloy, inserted in each end of each helix as a pliable core which will overcome the resilience of the wire helix at that part and when bent will retain the end of the helix also in the bent condition. For example each end of the helix and the core therein may be bent to a hook or loop shape to anchor the helix to an annular wire at the side edges of the tire casing.

In the completed casing the wire can be filled in or combined with rubber or not, as desired.

In the appended drawings I have illustrated the application of the invention—

Figure 3 is a view of the end of a compound wire helix with a steel core inserted in the end thereof.

Figure 4 is a view of part of the helix and its core with the end bent into a hook like member.

Figure 5 is a view of the end parts of a pair of helices bent in a manner to produce a beaded form of edge in a tire casing in which they are components.

Figure 6 illustrates two oppositely hooked ends of helices ready for hooking onto annular wires in the edge of the tire casing.

Figure 7 illustrates a feature in the bending of the ends of the helices so that the hook parts may be vertical and nest snugly together at the edge of the tire when the main parts are inclined to pass diagonally across a tire casing as in Figure 1.

Figure 8 illustrates a modification in the form of core.

Figure 1:
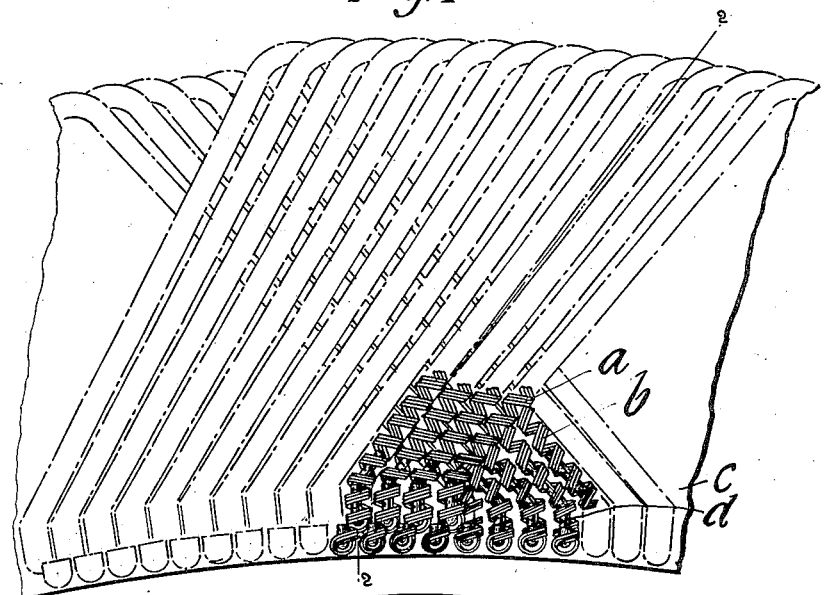
Figure 1 is a diagrammatical view of a portion of a tire casing in side elevation.
Figure 2:
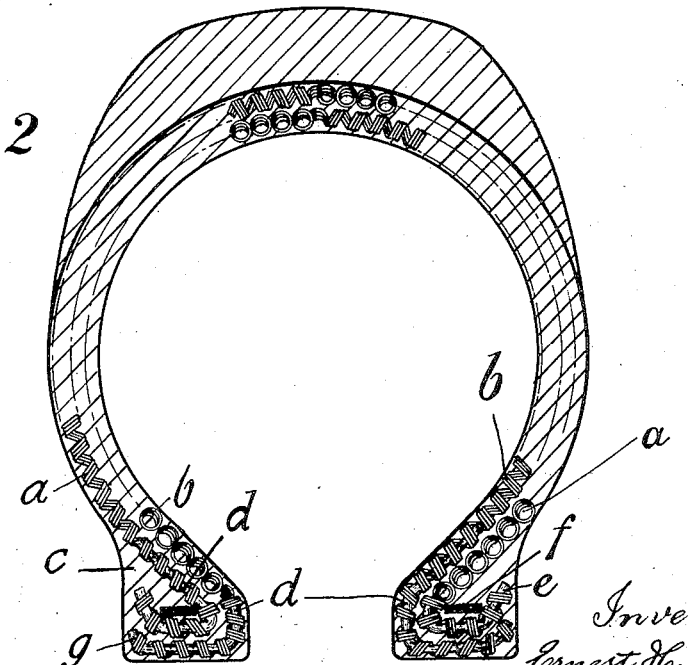
Figure 2 is a section on line 2—2 of Figure 1.

In the drawings at Figures 1 and 2, $a$ represents one layer of wire helices, $b$, a second layer of wire helices, and $c$ the side edge or bead of the tire cover. These helices pass diagonally over the perimeter of the tire casing from one side edge to the other, the direction of the helices in one layer $a$ being opposite to that of the helices in the other layer $b$. The helices shown in these drawings are three fold or three wire helices, but obviously a single wire helix, or any other wire helix, suitable for the purpose may be employed. To enable the ends of the helices to be bent or fashioned as desired at the side edges of the casing, to form beaded edges, straight sided tires, wired edges or any other suitable termination for anchoring in the tire rim, the helices are provided with an insertion or core $d$, see Figure 3. This core $d$ may be a short length of steel, or other suitable wire, fitted in the end of the helix and bent to the desired shape.

The ends of the helices in the outer layer $a$ of the example shown in Figures 1 and 2, with the cores $d$ in place, are bent outwardly and upwardly as at $e$ around a wire gauze tape or the like $f$, and the ends of the helices $b$ are bent to a complementary form as at $g$.

When the casing is filled with rubber, or embedded in rubber in a suitable moulding or other process, a thickened side edge is formed for the complete tire cover around the outwardly bent parts $e$ and $g$ of the helices. But instead of this construction the helices may (when fitted with the cores $d$) be bent to form other types of edges. For example each end of a wire helix and its core $d$ may be bent to a hook or loop shape as at Figure 4 suitable for anchoring the helix to an annular wire at the side edges of a tire casing.

In another case the ends of the helices $a$ in one layer of the tire casing may be bent as at $h$, Figure 5, and the ends of the helices in the second layer bent oppositely as at $i$ so as to form when assembled an approximation in section to that of an ordinary beaded edge tire casing. In Figure 6 I have shown the ends of two helices (representing two layers) with opposite hook bends $j, k$, so that they may be oppositely anchored onto annular wires $l$ at the side edges of the casing.

As shown at Figure 7 the hook or loop ends of a helix may be set at an angle to the part which passes over the crown of the tire casing; this enables the ends of all the various helices which are hooked onto annular wires at the side edges of the tire casing to nest evenly together, as shown at Figure 1, whilst the intermediate portions of the helices cross diagonally over the tire crown.

The cores $d$ may be formed like staples to engage two helix ends as at $m$ Figure 8, or they may be formed as projections from an arcuate or ring member to engage a number of helix ends. These ends are subsequently bent to desired shape as before. In applying the method to a tire casing, comprised of transverse helices connected together by interweaving as in Patent No. 1,133,153 the ends of some of the transverse helices, say alternate ones, of the casing may be extended so as to be longer than the rest of the wire fabric, and into these the cores $d$ may be inserted, and the ends may be bent to the desired shape for forming a wired edge, beaded edge, or other side edge on the tire casing.

The above described embodiments of the invention are the best known to me, but my invention, comprising the combination of the ductile members with the ends of the resilient helices for the above purpose, is not restricted to any particular constructional form.

I claim:

1. In combination in a casing for a pneumatic tire, a plurality of wire helices passing from one side edge of the tire to the other side edge, ductile nonresilient cores in the ends of said helices, said cores being capable of bending, but incapable of returning to normal position, so that the ends of the helices may be bent and retained after bending, by means of said nonresilient cores in a desired position to form a side edge to said casing.

2. In combination in a casing for a pneumatic tire a plurality of wire helices passing from one side edge of the casing to the other side edge, ductile nonresilient cores inserted in the ends of certain of said helices around the casing on each side thereof, said ends of said helices with the ductile inserted cores being bent to a suitable shape to cooperate in forming an annular thickened side edge on each side of said casing.

3. In combination in a casing for a pneumatic tire a plurality of layers of wire helices passing from one side edge of the casing to the other side edge, said helices passing obliquely from side edge to side edge and the helices in one layer being oppositely inclined to those of the adjacent layer, ductile nonresilient cores inserted in the ends of said helices, said ends of said helices with said cores in place being fashioned so as to form thickened side edges to the said tire casing.

4. In combination in a casing for a pneumatic tire a plurality of layers of wire helices passing from one side edge of the casing to the other side edge, said helices passing obliquely from side edge to side edge and the helices in one layer being oppositely inclined to those of the adjacent layer, ductile nonresilient cores inserted in the ends of said helices of each of said layers, the said ends of the helices in one layer with the cores therein being bent to nest within the complementarily bent ends of the helices of the other layer so that together said ends of said helices form an enlargement at the side edges of said tire casing.

In testimony whereof I affix my signature.

ERNEST HENRY JONES.